(12) United States Patent
Hecht et al.

(10) Patent No.: US 8,714,886 B2
(45) Date of Patent: May 6, 2014

(54) THREADING CUTTING TOOL AND DOUBLE-SIDED INDEXABLE THREADING CUTTING INSERT THEREFOR

(75) Inventors: Gil Hecht, Nahariya (IL); Danny Chen, Nahariya (IL)

(73) Assignee: Iscar, Ltd., Tefen (IL)

( * ) Notice: Subject to any disclaimer, the term of this patent is extended or adjusted under 35 U.S.C. 154(b) by 14 days.

(21) Appl. No.: 13/527,316

(22) Filed: Jun. 19, 2012

(65) Prior Publication Data

US 2013/0336733 A1    Dec. 19, 2013

(51) Int. Cl.
*B23B 27/08*    (2006.01)
*B23B 27/22*    (2006.01)

(52) U.S. Cl.
USPC ............. 407/113; 407/66; 407/103; 407/107

(58) Field of Classification Search
USPC ............. 407/66, 67, 101, 103, 107, 108, 113, 407/114
See application file for complete search history.

(56) References Cited

U.S. PATENT DOCUMENTS

| | | | |
|---|---|---|---|
| 3,613,197 A * | 10/1971 | Stier | 407/113 |
| 5,004,379 A * | 4/1991 | Little | 407/113 |
| 5,308,197 A * | 5/1994 | Little | 407/101 |
| 6,527,485 B1 * | 3/2003 | Little | 407/24 |
| 6,942,434 B2 * | 9/2005 | Friedman et al. | 407/113 |
| 7,597,508 B2 * | 10/2009 | Hecht | 407/101 |
| 2003/0156910 A1 | 8/2003 | Friedman et al. | |
| 2007/0231089 A1 | 10/2007 | Hecht | |

OTHER PUBLICATIONS

International Search Report dated Oct. 14, 2013 issued in PCT counterpart application (No. PCT/IL2013/050462).

* cited by examiner

*Primary Examiner* — Will Fridie, Jr.
(74) *Attorney, Agent, or Firm* — Womble Carlyle

(57) ABSTRACT

A double-sided indexable threading cutting insert includes two opposite end surfaces and a common periphery extending therebetween. The periphery includes exactly five identical peripheral sections and exactly five identical peripheral segments. Each peripheral segment extends between two adjacent peripheral sections and each peripheral section includes two adjacent abutment sections located between two rake faces. In a plan view of each end surface, each abutment section lies on a portion of an imaginary five-pointed star which includes five outer vertices alternating with five inner vertices. The cutting insert includes five cutting portions, each cutting portion is associated with a respective outer vertex, each cutting portion extends outwardly, and each cutting portion includes two opposite cutting tips.

23 Claims, 3 Drawing Sheets

THREADING CUTTING TOOL AND DOUBLE-SIDED INDEXABLE THREADING CUTTING INSERT THEREFOR

FIELD OF THE INVENTION

The subject matter of the present application relates to thread making, or threading, cutting tools.

BACKGROUND OF THE INVENTION

Cutting tools of the field are known and disclosed, for example, in U.S. Pat. No. 5,004,379.

SUMMARY OF THE INVENTION

In accordance with the subject matter of the present application there is provided a double-sided indexable threading cutting insert. The cutting insert comprises two opposite end surfaces and a common periphery which extends therebetween. The periphery comprises exactly five identical peripheral sections and exactly five identical peripheral segments. Each peripheral segment extends between two adjacent peripheral sections and each peripheral section comprises two adjacent abutment sections located between two rake faces. In a plan view of each end surface, each abutment section lies on a portion of an imaginary five-pointed star having five outer vertices alternating with five inner vertices, the outer vertices being located radially outward of the inner vertices, with each outer vertex forming a tip point of the star and can be located within one of the peripheral segments. The cutting insert further comprises five cutting portions, each cutting portion is associated with a respective peripheral segment and outer vertex, each cutting portion extends outwardly, and each cutting portion can have two opposite cutting tips.

In accordance with the subject matter of the present application there is further provided a tool body which comprises top and bottom surfaces which extend between two side surfaces. The tool body comprises a unitary one-piece pocket at a tool body front end. The pocket comprises: a base surface; three spaced apart protrusions which extend from the base surface; and first, second and third abutment surfaces which are respectively located on each protrusion. Each abutment surface is transverse to the base surface and may even be perpendicular thereto.

The second and third abutment surfaces are located rearwards of the first abutment surface and converge rearwardly away from the tool body front end. The first and second abutment surfaces are located downwards of the third abutment surface and converge downwardly, away from the top surface.

In accordance with the subject matter of the present application there is further provided a threading cutting tool which comprises the tool body and the cutting insert secured therein via a screw. One of the end surfaces abuts the base surface and three adjacent abutment sections of adjacent peripheral sections respectively abut the first, second and third abutment surfaces.

It is understood that the above-said is a summary, and that any of the aspects above can further comprise, or be further defined with, any of the features described in connection with any of the other aspects or described hereinbelow. For example, the following features may be applicable to any of the above aspects of the subject matter of the application:

The cutting tips are located between parallel end planes P defined by inner-most portions of the end surfaces.

The cutting insert can have a symmetry plane SP which is located midway between the end surfaces, and a symmetry axis S which is perpendicular thereto. In a plan view of each end surface, the cutting insert has a five-fold rotational symmetry about the symmetry axis S.

The cutting insert can comprise an insert through bore which extends between the end surfaces. The insert bore can have an insert bore axis B, about which the cutting insert has a five-fold rotational symmetry.

Each end surface can comprise end abutment surfaces which can be located adjacent the periphery.

In a plan view of each end surface, each outer vertex can have a first internal angle α defined by two opposite abutment sections, each located on a respective side of the outer vertex.

Every two opposite abutment sections associated with a given outer vertex can converge outwardly.

The first internal angle α can be set within a range of 30° to 120°.

In a plan view of each end surface, each cutting portion can have a second internal angle β defined by two opposite rake faces, each located on a respective side of the cutting portion.

The opposite rake faces associated with a given outer vertex can converge inwardly.

The second internal angle β can be set within a range of 32° to 72°.

In a plan view of each end surface, every two adjacent cutting tips are located at opposite ends of the respective peripheral segment.

Each abutment section can be located between a rake face and an adjacent abutment section.

Every two adjacent protrusions are separated by a recess, respectively located at rear and bottom ends of the pocket.

The first abutment surface faces upwards, towards the top surface.

The pocket can comprise a clamping bore which opens out to the base surface and the clamping bore has a longitudinal clamping bore axis.

The abutment surfaces can be planar.

Each abutment surface can have an imaginary central line N, which can be normal thereto, and directed such that it does not meet the bore axis C.

BRIEF DESCRIPTION OF THE DRAWINGS

For a better understanding of the subject matter of the present application and to show how the same may be carried out in practice, reference will now be made to the accompanying drawings, in which.

Figure 1:
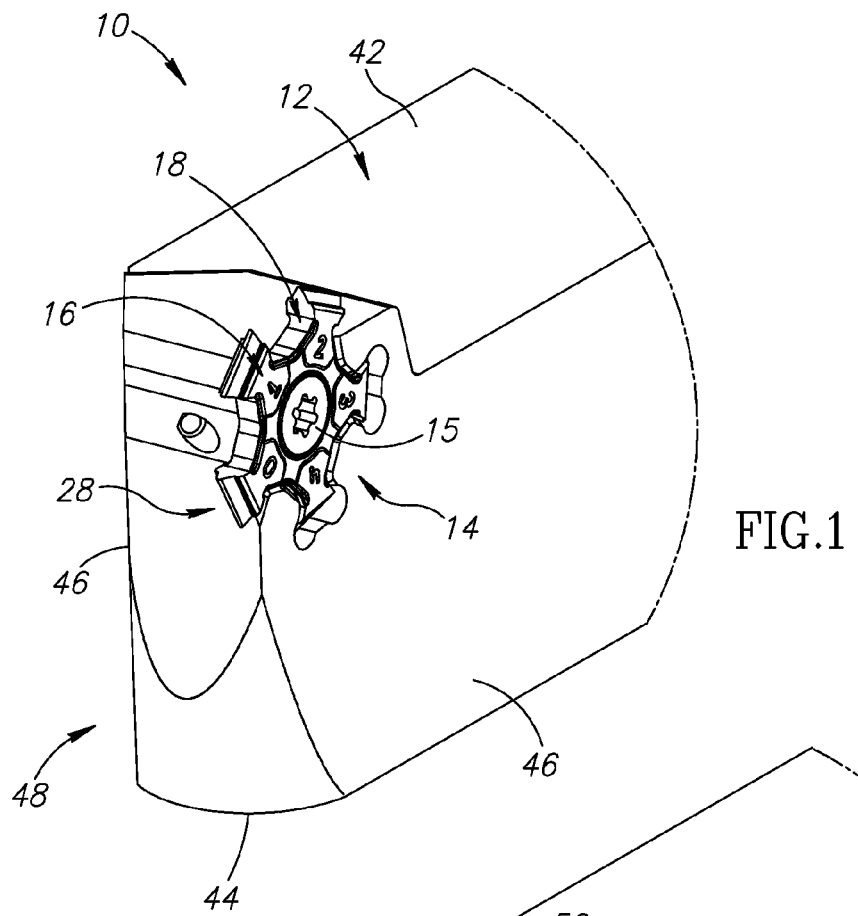
FIG. 1 is an isometric view of an assembled threading cutting tool.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein. Furthermore, in the following description, the words forward, rearward, upward and downward, and any synonyms thereto, or similar directionality wording, will refer to respective directions Df, Dr, Du, Dd shown in FIG. 3.

Figure 2:
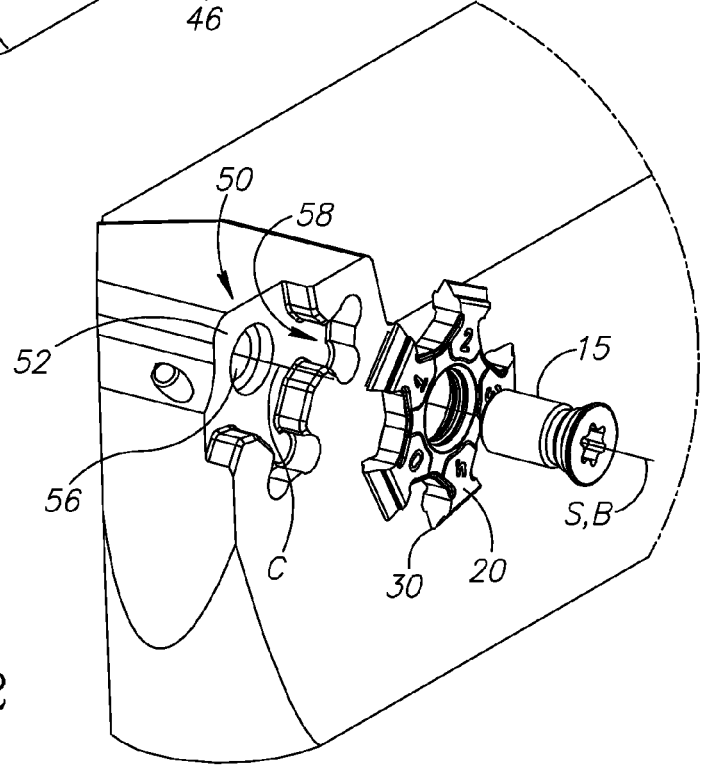
FIG. 2 is an isometric exploded view of the threading cutting tool of FIG. 1.

Reference is made to FIGS. 1 and 2. A threading cutting tool 10 includes a tool body 12 and a double-sided indexable threading cutting insert 14 which can be secured thereto via a screw 15.

Figure 4:
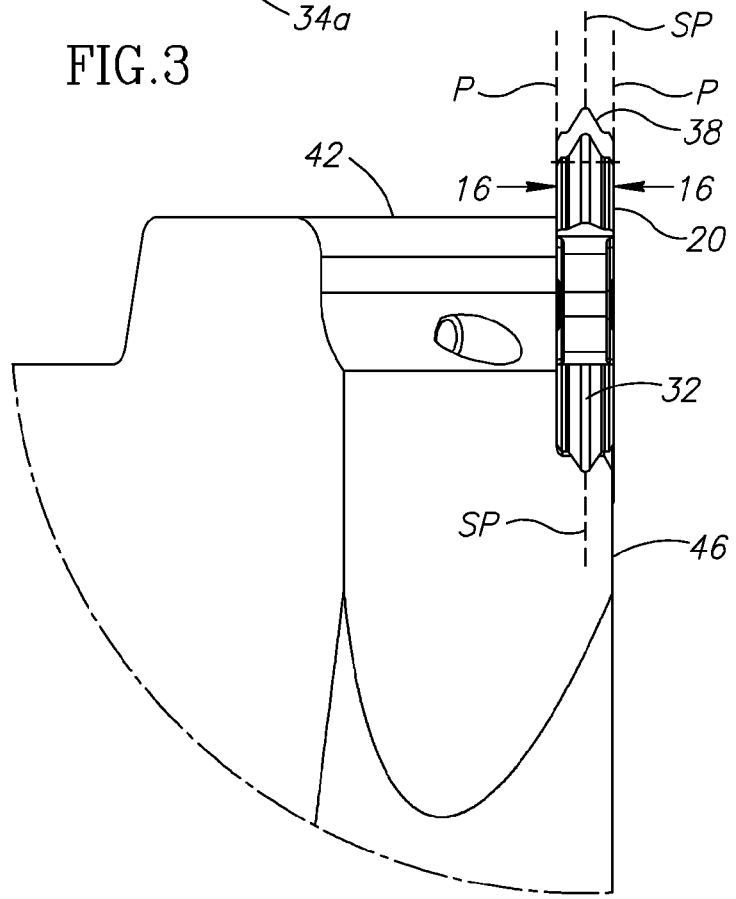
FIG. 4 is a front view of the cutting tool of FIG. 1.
Figure 5:
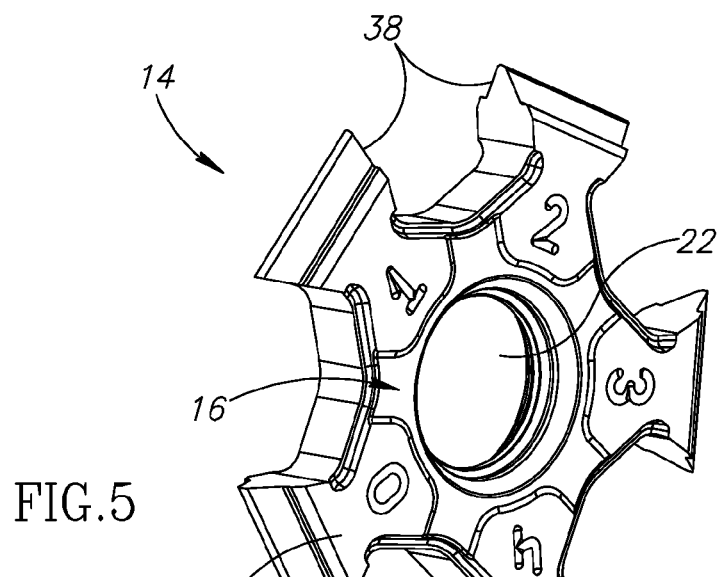
FIG. 5 is an isometric view of a cutting insert.

The cutting insert 14 includes two opposite, and identical, end surfaces 16 and a common periphery 18 which extends therebetween. The cutting insert has an imaginary symmetry plane SP, which is located midway between the end surfaces 16. The cutting insert 14 is minor symmetric about the symmetry plane SP (FIG. 4). The thinnest portion of the cutting insert 14 defines two parallel end planes P which are also parallel to the symmetry plane SP. In other words, in a plan view of the periphery 18 of the cutting insert 14 (FIG. 4), the inner most portions of the end surfaces 16, define the end planes P. Yet another way of defining the end planes P is that portions of the end surfaces 16 which are closest to the symmetry plane SP define, or lie in, the end planes P.

According to the present example, each end surface 16 includes five end abutment surfaces 20. In a plan view of each end surface 16, the end abutment surfaces can be located adjacent the periphery 18. Each end abutment surface 20 can project outwardly from the respective end surfaces 16. The end abutment surfaces 20 can be the outward most portion of the cutting insert 14 in a direction perpendicular to the end planes P (FIG. 4). The cutting inset has a symmetry axis S which is perpendicular to the end planes P. In a plan view of each end surface 16, the cutting insert 14 has five-fold rotational symmetry about the symmetry axis S. The cutting insert 14 can include an insert through bore 22 which opens out to both end surfaces 16. The insert bore 22 has an insert bore axis B which can be co-axial with the symmetry axis S.

Figure 3:
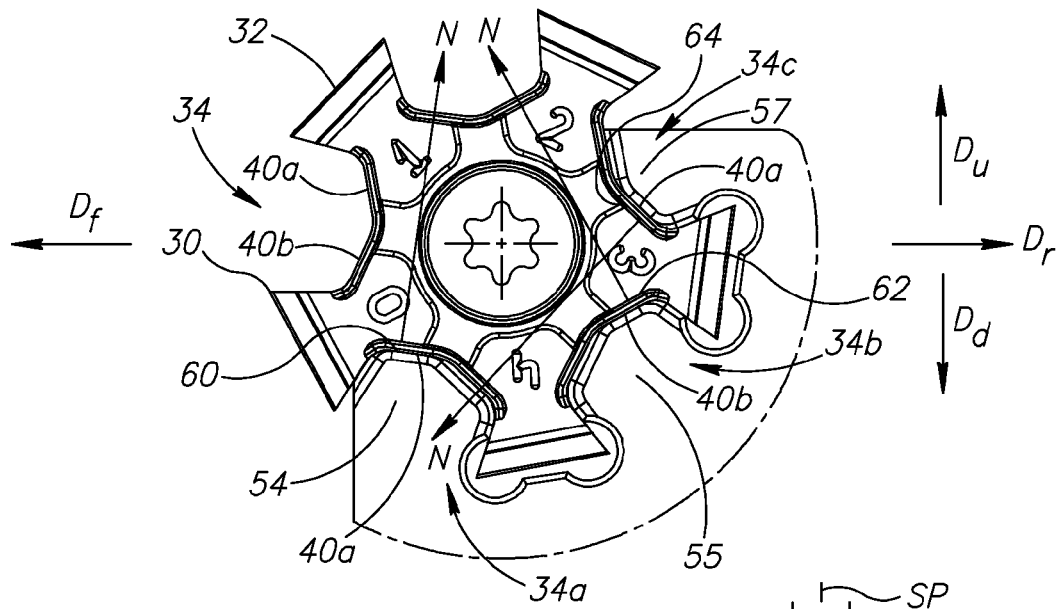
FIG. 3 is a side plan view of the cutting tool of FIG. 1, which shows four main directions: upwards (Du), downwards (Dd), forward (Df) and rearward (Dr)
Figure 6:
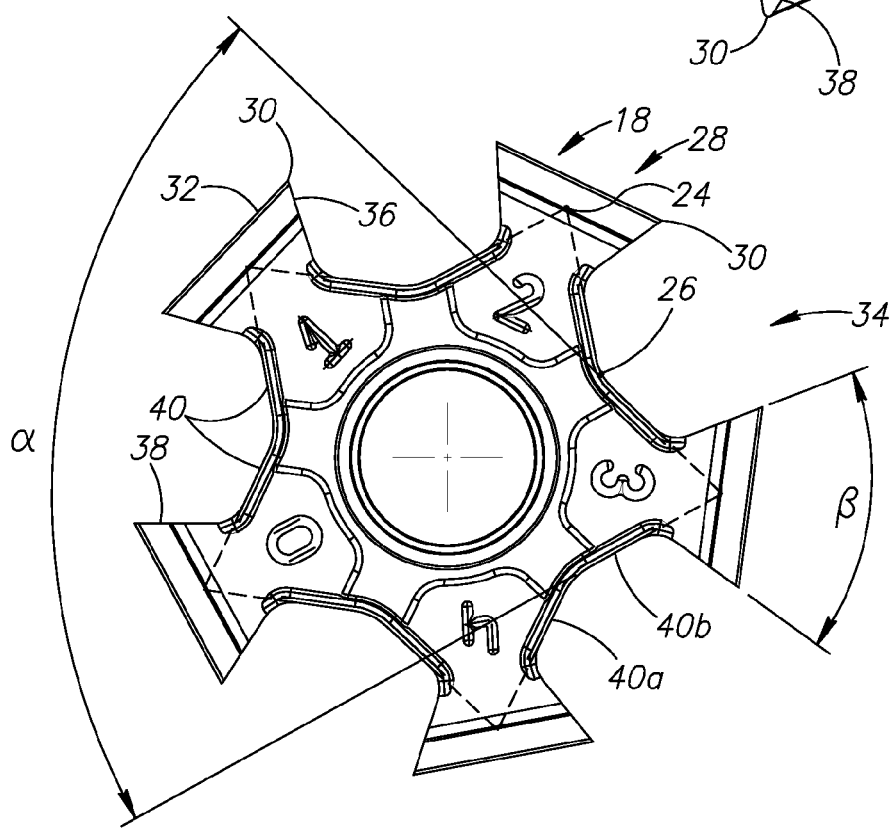
FIG. 6 is a plan view of the cutting insert of FIG. 5.

Attention is drawn to FIGS. 3 and 6. The cutting insert 14 has five cutting portions 28, each of which can include two opposite cutting tips 30. The cutting insert 14 can therefore have ten cutting tips 30. Each cutting portion 28 extends outwardly away from the symmetry axis S. All cutting tips 30 are located between the planes P (FIG. 4).

The periphery 18 has five peripheral segments 32, and five peripheral sections 34. Each peripheral section 34 extends between two adjacent peripheral segments 32. Each peripheral section 34 can include two rake faces 36, four cutting edges 38 and two abutment sections 40 (40a, 40b).

In each peripheral section 34, the two abutment sections 40 can be adjacent, identical and located between the two rake faces 36. In a given plan view of an end surface 16, a clockwise leading first abutment section 40a is forward (or "leading") in a clockwise direction as compared to a clockwise trailing second abutment section 40b which is rearward (or "trailing") in the clockwise direction. Each abutment section 40 can be located between a rake face 36 and an adjacent abutment section 40.

In a plan view of each of the end surfaces 16, the abutment sections 40 can lie on portions of a sidewall of an imaginary five point star (see FIG. 6) which defines five outer vertices 24 alternating with five inner vertices 26. In the same view, each outer vertex 24 is associated with a cutting portion 28 and a peripheral segment 32, the outer vertices 24 being located radially outward of the inner vertices 26, with each outer vertex 24 forming a tip point of the star and can be located within one of the peripheral segments 32. Each inner vertex 26 is associated with a peripheral section 34, constitutes an external angle formed at the intersection of lines defined by two adjacent abutment sections 40, and is located proximate an external surface of the cutting insert 14 near the middle of the peripheral section 34. In the same view, each outer vertex 24 has a first internal angle $\alpha$ defined by two opposite abutment sections 40, each located on a respective side of the outer vertex 24. In other words, the angle $\alpha$ can be defined by every two adjacent abutment sections 40, each of the two belongs to a different peripheral section 34. In the same view, the abutment sections 40 which define the angle $\alpha$ converge outwardly, i.e., away from the symmetry axis S. The angle $\alpha$ can be set within a range of 30° to 120°. According to the present example, the first internal angle $\alpha$ can be set to 73°. In the same view, each cutting portion 28 has a second internal angle $\beta$ defined by two opposite rake faces 36, each located on a respective side of the cutting portion 28. In other words, the angle $\beta$ can be defined by every two adjacent rake faces 36, each of which belongs to a different peripheral section 34. In the same view, the rake faces 36 which define the angle $\beta$ converge inwardly, i.e., towards the symmetry axis S. The angle $\beta$ can be set within a range of 32° to 72°. According to the present example, the second internal angle $\beta$ can be set to 57°. Each cutting edge 38 can be formed at a meeting, or intersection, of a portion of each end surface 16 with a portion of the peripheral section 34. Specifically, each cutting edge 38 can be formed at a meeting between a portion of each end surface 16 and a portion of a rake face 36. Each rake face 36 can extend between two adjacent cutting edges 38. Each cutting tip 30 can be formed at a merger, intersection, or meeting between two adjacent cutting edges 38 of the same peripheral section 34. The cutting edges 38 can form an acute angle therebetween (FIG. 4). The cutting edges 38 can be straight.

Each peripheral segment 32 can extend between two cutting tips 30 on a single cutting portion 28. According to the present example, in a plan view of each end surface 16, the peripheral segments 32 can be straight. In an operative position, i.e., when the cutting tool 10 machines a workpiece, the peripheral segments 32 can be configured to be relieved from the workpiece. In other words, each peripheral segment 32 can include portions, adjacent the cutting tips 30, which can function as relief regions. According to the present example, in a view perpendicular to the symmetry axis S (FIG. 4), each peripheral segment 32, at the cutting tip 30, can have a curved shape at an outer most portion thereof, farthest from the symmetry axis S.

The tool body 12 has top and bottom surfaces 42, 44 and two side surfaces 46 which extend therebetween. At a tool body front end 48, the tool body 12 includes a one-piece unitary pocket 50. In other words, beside the screw 15, which clamps, or secures the cutting insert 14 in the pocket 50, the pocket 50 does not include any removable parts. This one-piece, unitary design can help reduce production costs for the tool body 12. The pocket 50 can include a base surface 52 and first, second and third protrusions 54, 55, 57. The base surface 52 can be parallel to the side surfaces 46 and it can include a threaded clamping bore 56 which has a longitudinal clamping bore axis C. The protrusions 54, 55, 57 extend outwardly from the base surface 52. Each pair of adjacent protrusions 54 are spaced apart by a recess 58 which, in an assembled position of the cutting inset 14, is configured to accommodate a cutting portion 28 of the cutting insert 14. Each of the protrusion 54, 55, 57 has a respective abutment surface, namely, first, second and third abutment surfaces 60, 62, 64. The abutment surfaces 60, 62, 64 can be planar. The abutment surfaces 60, 62, 64 are transverse to the base surface 52 and can be perpendicular thereto. Each abutment surface 60, 62, 64 faces a direction which does not meet with the clamping bore axis C. In other words, each abutment surface 60, 62, 64 has an imaginary central line N (see FIG. 3), which is normal to the abutment surface 60, 62, 64 and directed such that it does not intersect the clamping bore axis C. In an assembled position, as a result from this orientation of the abutment surfaces 60, 62, 64, abutment forces can be diverted away from the clamping bore axis C and therefore forces can be generated against rotation of the cutting insert 14 in the pocket 50.

Two of the three abutment surfaces 60, 62, 64, i.e. the second and third abutment surfaces 62, 64, are located rearwardly from the first abutment surface 60. The second and third abutment surfaces 62, 64 converge rearwardly (in the direction Dr), away from the tool body front end 48. Two of the three abutment surfaces, i.e. the first and second abutment surfaces 60, 62, are located downwardly from, or under, the third abutment surface 64. The first and second abutment surfaces 60, 62 converge downwardly (in the direction Dd) towards the bottom surface 44. The first abutment surface 60 is located closest to the tool body front end 48. The first abutment surface 60 can face upwards, towards the top surface 42. Stated differently, the imaginary central line N which is normal to the first abutment surface 60 can be directed upwards. During cutting operations, this directionality of the first abutment surface 60 can help maximize the reaction, or support, forces against machining forces. This also reduces, or prevents, rotation of the cutting insert 14 in the pocket 50.

In an assembled position the cutting insert 14 can be secured, or clamped, in the pocket 50 via the screw 15, which is screw threaded into the clamping bore 56 in the pocket 50. The end abutment surface 20 of one end surface 16 abuts the base surface 52. Three abutment sections 40 of adjacent peripheral sections 34 respectively abut the three abutment surfaces 60, 62, 64 of the pocket 50. In particular, the clockwise leading abutment sections 40a belonging to two spaced apart peripheral sections 34a and 34c abut abutment surfaces 60 and 64, respectively, while the clockwise trailing abutment section 40b belonging to intervening peripheral section 34b abuts intervening abutment surface 62. Thus, only one of two adjacent abutment surfaces 40a, 40b belonging to three consecutive peripheral section 34a, 34b, 34c abut the pocket at a given time. Two cutting portions 28 are located in respective recesses 58 in the insert pocket 50. According to the present example, the clamping bore axis C is not co-axial with the insert bore axis B. This eccentricity is used such that the screw pushes the cutting insert 14 onto the abutment surfaces 60, 62, 64 in the pocket. This three-point abutment between the abutment sections 40 and the abutment surfaces 60, 62, 64, provides a secure lock, which prevents the cutting insert 14 from moving or turning in the pocket 50 during machining, as well as repeatability.

The description above includes exemplary embodiments and details for enablement, if needed, of claimed subject matter, and does not exclude non-exemplified embodiments and details from the claim scope of the present application.

What is claimed is:

1. A double-sided indexable threading cutting insert (14), comprising:
    two opposite end surfaces (16) and a common periphery (18) extending therebetween, the periphery (18) comprising exactly five identical peripheral sections (34) and exactly five identical peripheral segments (32),
    each peripheral segment (32) extending between two adjacent peripheral sections (34),
    each peripheral section (34) comprising two adjacent abutment sections (40) located between two rake faces (36),
    in a plan view of each end surface (16) each abutment section (40) lies on a portion of an imaginary five-pointed star having five outer vertices (24) alternating with five inner vertices (26), the outer vertices (24) being radially outward of the inner vertices (26) with each outer vertex (24) forming a tip point of the star; and
    five cutting portions (28), each cutting portion (28) being associated with a respective peripheral segment (32) and outer vertex (24), each cutting portion (28) extending outwardly, and each cutting portion (28) having two opposite cutting tips (30).

2. The threading cutting insert (14) according to claim 1, wherein the cutting tips (30) are located between parallel end planes (P) defined by inner-most portions of the end surfaces (16).

3. The threading cutting insert (14) according to claim 1, wherein the cutting insert (14) has a symmetry plane (SP) which is located midway between the end surfaces (16) and a symmetry axis (S) which is perpendicular thereto; and in a plan view of each end surface (16), the cutting insert (14) has a five-fold rotational symmetry about the symmetry axis (S).

4. The threading cutting insert (14) according to claim 3, wherein the cutting insert (14) is minor symmetric about the symmetry plane (SP).

5. The threading cutting insert (14) according to claim 1, wherein the cutting insert (14) comprises an insert through bore (22) which extends between the end surfaces (16), the insert bore (22) has an insert bore axis (B), about which the cutting insert (14) has a five-fold rotational symmetry.

6. The threading cutting insert (14) according to claim 1, wherein each end surface (16) comprises end abutment surfaces (20) which are located adjacent the periphery (18).

7. The threading cutting insert (14) according to claim 1, wherein in a plan view of each end surface (16), each outer vertex (24) has a first internal angle (α) defined by two opposite abutment sections (40), each located on a respective side of the outer vertex (24).

8. The threading cutting insert (14) according to claim 7, wherein the two opposite abutment sections (40) associated with the outer vertex (24) converge outwardly.

9. The threading cutting insert (14) according to claim 7, wherein the first internal angle (α) is in a range of 30° to 120°.

10. The threading cutting insert (14) according to claim 1, wherein in a plan view of each end surface (16), each cutting portion (28) has a second internal angle (β) defined by two opposite rake faces (36), each located on a respective side of the cutting portion (28).

11. The threading cutting insert (14) according to claim 10, wherein the opposite rake faces (36) associated with the outer vertex (24) converge inwardly.

12. The threading cutting insert (14) according to claim 10, wherein the second internal angle (β) is in a range of 32° to 72°.

13. The threading cutting insert (14) according to claim 1, wherein in a plan view of each end surface (16), the two opposite cutting tips (30) are located at opposite ends of the peripheral segment (32) associated with the cutting portion (28) to which they belong.

14. The threading cutting insert (14) according to claim 1, wherein each abutment section (40) is located between a rake face (36) and an adjacent abutment section (40).

15. A tool body (12) comprising top and bottom surfaces (42, 44) extending between two side surfaces (46) and a unitary one-piece pocket (50) at a tool body front end (48), the pocket (50) comprising:

a base surface (52);

three spaced apart protrusions (54, 55, 57) extending from the base surface (52); and first, second and third abutment surfaces (60, 62, 64) respectively located on each protrusion (54, 55, 57), each abutment surface (60, 62, 64) being transverse to the base surface (52);

wherein the second and third abutment surfaces (62, 64) are located rearwards of the first abutment surface (60) and converge rearwardly, away from the tool body front end (48); and the first and second abutment surfaces (60, 62) are located downwards of the third abutment surface (64) and converge downwardly, away from the top surface (42).

16. The tool body (12) according to claim 15, wherein every two adjacent protrusions (54) are separated by a recess (58), respectively located at rear and bottom ends of the pocket (50).

17. The tool body (12) according to claim 15, wherein the first abutment surface (60) faces upwards, towards the top surface (42).

18. The tool body (12) according to claim 15, wherein the pocket (50) comprises a clamping bore (56) which opens out to the base surface (52), the clamping bore has a longitudinal clamping bore axis (C).

19. The tool body (12) according to claim 15, wherein the abutment surfaces (60, 62, 64) are planar.

20. The tool body (12) according to claim 18, wherein each abutment surface (60, 62, 64) has an imaginary central line (N), which is normal thereto, and directed such that it does not meet the clamping bore axis (C).

21. A threading cutting tool (10) comprising the tool body (12) according to claim 15 and the cutting insert (14) according to claim 1 secured therein via a screw (15); wherein one of the end surfaces (16) abuts the base surface (52); and three adjacent abutment sections (40) of adjacent peripheral sections (34a, 34b, 34c) respectively abut the first, second and third abutment surfaces (60, 62, 64).

22. The threading cutting tool (10) according to claim 21, wherein:

in a side view of the cutting insert (14) secured in the tool body (12), the two adjacent abutment sections (40) of each peripheral section (34) include a clockwise leading first abutment section (40a) and a clockwise trailing second abutment section (40b); and only one of the clockwise leading first abutment section (40a) and the clockwise trailing second abutment section (40b) of each peripheral section (34) abuts an abutment surface (60, 62, 64).

23. The threading cutting tool (10) according to claim 22, wherein:

the clockwise leading abutment sections (40a) belonging to two spaced apart peripheral sections (34a, 34c) abut the first and third abutment surfaces (60, 64), respectively, and the clockwise trailing abutment section (40b) belonging to an intervening peripheral section (34b) abuts second abutment surface (62).

* * * * *